(12) United States Patent
Osaka

(10) Patent No.: US 7,271,511 B2
(45) Date of Patent: Sep. 18, 2007

(54) AUTOFOCUS ACTUATOR

(75) Inventor: Tomohiko Osaka, Yamagata (JP)

(73) Assignee: Mitsumi Electric Co., Ltd. (JP)

( * ) Notice: Subject to any disclaimer, the term of this patent is extended or adjusted under 35 U.S.C. 154(b) by 0 days.

(21) Appl. No.: 11/321,889

(22) Filed: Dec. 28, 2005

(65) Prior Publication Data

US 2006/0203627 A1   Sep. 14, 2006

(30) Foreign Application Priority Data

Mar. 14, 2005  (JP)  ............... 2005-072022

(51) Int. Cl.
*H02K 41/35* (2006.01)
*G11B 7/08* (2006.01)
*G11B 7/09* (2006.01)

(52) U.S. Cl. .................. 310/12; 310/14; 359/824; 369/44.14; 369/44.16

(58) Field of Classification Search .......... 310/12, 310/15, 17, 51, 89; 369/44.11–44.17, 44.22, 369/44.32; 359/812–814, 823–824
See application file for complete search history.

(56) References Cited

U.S. PATENT DOCUMENTS

| 4,660,190 | A | * | 4/1987 | Fujii et al. | ............ | 369/44.16 |
| 5,191,484 | A | * | 3/1993 | Yeon et al. | ............ | 359/824 |
| 5,317,221 | A | * | 5/1994 | Kubo et al. | ............ | 310/12 |
| 5,317,552 | A | * | 5/1994 | Yamasaki | ............ | 369/44.14 |
| 6,909,464 | B2 | * | 6/2005 | Nomura et al. | ............ | 348/357 |
| 2005/0052087 | A1 | * | 3/2005 | Shinmura et al. | ............ | 310/89 |

FOREIGN PATENT DOCUMENTS

| JP | 2004-280031 | 7/2004 |
| JP | 2003-295033 | 10/2004 |

* cited by examiner

*Primary Examiner*—Tran Nguyen
(74) *Attorney, Agent, or Firm*—Marger Johnson & McCollom, P.C.

(57) ABSTRACT

An autofocus actuator includes a cover which is provided with elastic tabs in addition to protrusions to which a stopper attached to a holder with a lens unit abuts when the holder is excessively displaced by, for example, a fall of an electronic equipment provided with the autofocus actuator. The protrusions are provided on the peripheral edge of an opening formed in the cover, and the elastic tabs are also provided on the peripheral edge of the opening. Each of the elastic tab has one end which is supported on the cover and the other end which protrudes from the peripheral edge of the opening in a cantilever manner so that the other end makes abutment with the stopper attached to the holder before the stopper makes contact with the protrusions to thereby absorb a shock applied to the holder.

6 Claims, 15 Drawing Sheets

AUTOFOCUS ACTUATOR

BACKGROUND OF THE INVENTION

1. Field of the Invention

The present invention is related to an autofocus actuator, and in particular to an autofocus actuator which can be used in a compact electronic device equipped with a camera such as a digital camera or portable telephone or the like.

2. Description of the Prior Art

In digital cameras and the like, an actuator which can move lenses in the optical axis direction by the interaction between a magnetic field due to a permanent magnet and a magnetic field generated by electric current flowing through a coil is used for the purpose of carrying out autofocus and zoom. One example of such an actuator 100 is shown in FIGS. 16 and 17 which was filed by the applicant of this application.

The autofocus actuator 100 is composed of: a holder 110 including a cylindrical portion 111 having one end to which a lens assembly 105 is attached; a coil 120 fixedly secured to the holder 110 so that it is positioned around the cylindrical portion 111; a yoke 130 including a plurality of permanent magnets 140 disposed in a spaced-apart confronting relationship with the coil 120; a pair of leaf springs 160U, 160L for supporting the holder 110 displaceably in an optical axis direction with the holder 110 being positioned in a radial direction thereof; a stopper 170 attached to the holder 110 for securing the upper leaf spring 160U between the holder 110 and the stopper 170 in a sandwich manner; a cover 180 and a base 185 which are used as a pair of support frames, respectively, and provided outside of the pair of leaf springs 160U, 160L along the optical axis direction and adapted to secure the leaf springs 160U, 160L between the opposite end surfaces of the yoke 130 and the cover 180 and the base 185, respectively, in a sandwich manner, and both of the cover 180 and the base 185 having openings respectively formed at least on the parts that correspond to the lens assembly 105 attached to the holder 110; and a plurality of protruding portions which protrude inwardly from the peripheral edge of the opening of the cover 180 for restricting displacement of the holder 110 to which the stopper 170 is attached.

In the autofocus actuator 100 described above, the lens unit 105 attached to the holder 110 is displaceable in the optical axis direction by the interaction between the magnetic field of the permanent magnets 140 and the magnetic field generated by electric current flowing through the coil 120 when the electric current is supplied to the coil 120.

As an example of the external dimensions of an autofocus actuator mounted in a portable telephone, the length is approximately 10 mm, the width is approximately 10 mm, and the thickness is approximately 5 mm.

However, in such an autofocus actuator 100, in the case where a portable telephone provided with the actuator 100 falls from a height where it was being used, the stopper 170 attached to the holder 110 abuts against the protruding portions 183 so that a shock is applied to the holder 110. This causes a problem such as deformation of the leaf springs 160U, 160L and separation of bonding surfaces between the individual components, and the like, so that the autofocus actuator 100 is damaged.

SUMMARY OF THE INVENTION

In view of the problems described above, it is an object of the present invention to provide an autofocus actuator having an improved shock resistance.

In order to achieve the above object, the present invention is directed to an autofocus actuator which comprises:

a holder including a cylindrical portion having one end to which a lens unit is attached;

a coil fixedly secured to the holder in such a manner as to surround the cylindrical portion of the holder;

a yoke provided with permanent magnets in a spaced-apart confronting relationship with the coil;

a pair of leaf springs for supporting the holder displaceably in an optical axis direction with the holder being positioned in a radial direction thereof;

a stopper attached to the one end of the cylindrical portion of the holder for securing the upper leaf spring between the holder and the stopper in a sandwich manner; and a pair of support frames provided outside of the pair of leaf springs in the optical axis direction, respectively, and adapted to secure the leaf springs between the opposite end surfaces of the yoke and the support frames, respectively, in a sandwich manner, and these support frames having openings respectively formed at least on the parts thereof that correspond to the lens assembly attached to the holder; and a plurality of protrusions which protrude inwardly from the peripheral edge of the opening of one of the support frames positioned on the side of the one end of the holder for restricting displacement of the holder to which the stopper is attached together, wherein the holder to which the lens unit is attached being capable of adjusting its position in the optical axis direction by the interaction between the magnetic field of the permanent magnets and the magnetic field generated by electric current flowing through the coil when the electric current is supplied to the coil, and wherein the autofocus actuator further comprises means provided in the one support frame for absorbing a shock applied to the holder caused by the abutment of the stopper attached to the holder against the protrusions due to excessive displacement of the holder.

According to the autofocus actuator having the above structure, when an electronic equipment provided with the actuator falls from a certain height, the holder first abuts against the shock absorbing means to absorb a shock that is to be caused by abutment of the stopper attached (bonded) to the holder comes into abutment with the protruding portions so that it is possible to prevent the autofocus actuator from being damaged, thereby enabling a shock resistance of the autofocus actuator to be improved.

In the autofocus actuator according to the present invention, it is preferred that the shock absorbing means is formed from at least one elastic tab having one end which is supported on the one support frame and the other end which protrudes inwardly from the peripheral edge of the opening of the support frame in a cantilever manner so that the other end makes abutment with the stopper attached to the holder before the stopper makes contact with the protrusions.

According to this structure, the elastic tab absorbs the kinetic energy of the holder to which the stopper is attached, so that it is possible to absorb the shock applied to the holder when the stopper attached to the holder makes abutment with the protruding portions.

Further, in the autofocus actuator according to the present invention, it is preferred that the at least one elastic tab and the protrusions are respectively provided at three or more locations along the circumferential direction of the opening of the one support frame alternately with the same spacing therebetween.

According to this structure, it is possible to restrict the excessive displacement of the holder to relive the shock at the time when the stopper attached to the holder makes abutment with the protruding portions at three or more locations.

Furthermore, in the autofocus actuator according to the present invention, it is preferred that the elastic tab is integrally formed with the support frame.

According to this structure, it is possible to form the shock absorbing means on the support framer without increasing the process steps and the number of components.

Furthermore, in the autofocus actuator according to the present invention, it is preferred that the one support frame is formed of a liquid crystalline polymer.

This makes it possible to provide an autofocus actuator having superior toughness.

Moreover, in the autofocus actuator according to the present invention, it is preferred that at least one of the protrusions has a surface facing the holder, and the shock absorbing means includes an elastic body provided on the surface of the protrusion.

According to this structure, it is also possible to absorb the kinetic energy of the holder to which the stopper is attached, so that it is possible to absorb the shock applied to the holder when the stopper attached to the holder makes abutment with the protruding portions.

Another aspect of the present invention is directed to an autofocus actuator, which comprises:

a holder including a cylindrical portion having one end to which a lens unit is attached;

a coil fixedly secured to the holder in such a manner as to surround the cylindrical portion of the holder;

a yoke provided with permanent magnets in a spaced-apart confronting relationship with the coil;

a pair of leaf springs for supporting the holder displaceably in an optical axis direction with the holder being positioned in a radial direction thereof;

a pair of support frames provided outside of the pair of leaf springs in the optical axis direction, respectively, and adapted to secure the leaf springs between the opposite end surfaces of the yoke and the support frames, respectively, in a sandwich manner, and these support frames having openings respectively formed at least on the parts thereof that correspond to the lens assembly attached to the holder; and first displacement restricting means which protrudes inwardly from the peripheral edge of the opening of one of the support frames positioned on the side of the one end of the holder for restricting displacement of the holder, wherein the holder to which the lens unit is attached is capable of adjusting its position in the optical axis direction by the interaction between the magnetic field of the permanent magnets and the magnetic field generated by electric current flowing through the coil when the electric current is supplied to the coil, and wherein the autofocus actuator further comprises second displacement restricting means provided on the one support frame for absorbing a shock to be applied to the holder caused by the abutment of the holder against the first displacement restricting means due to excessive displacement of the holder.

According to the autofocus actuator having the above structure, when an electronic equipment provided with the actuator falls from a certain height, the holder first abuts against the second displacement restricting means to absorb a shock which is to be caused when the holder abut the first displacement restricting means, so that it is possible to prevent the autofocus actuator from being damaged, thereby enabling a shock resistance of the autofocus actuator to be improved.

The above and other objects and features of the invention will become more apparent from the following detailed description when the same is read in conjunction with the accompanying drawings that are presented for the purpose of illustration only.

DETAILED DESCRIPTION OF THE PREFERRED EMBODIMENT

Hereinbelow, preferred embodiments of an autofocus actuator according to the present invention will be described in detail with reference to the drawings.

Figure 1:
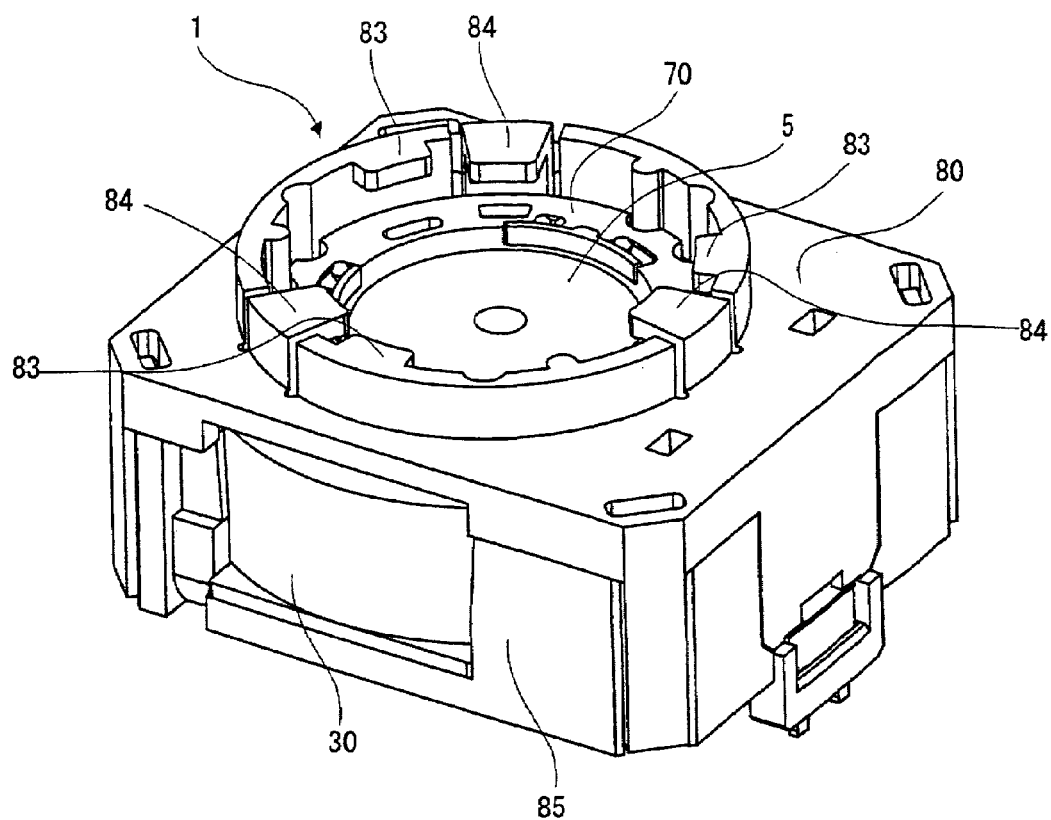
FIG. 1 is a perspective view showing the external appearance of an autofocus actuator of a preferred embodiment according to the present invention.
Figure 2:
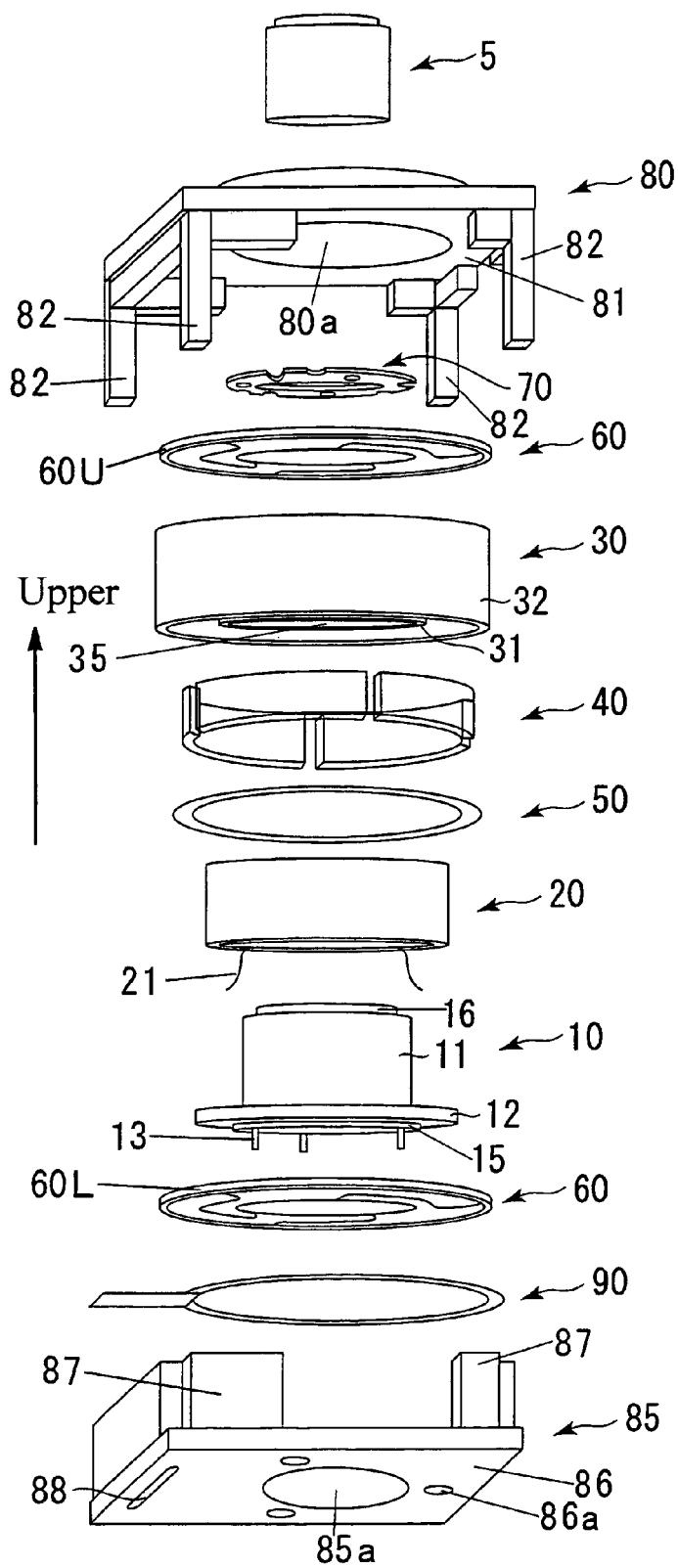
FIG. 2 is an exploded perspective view of the autofocus actuator shown in FIG. 1.
Figure 3:
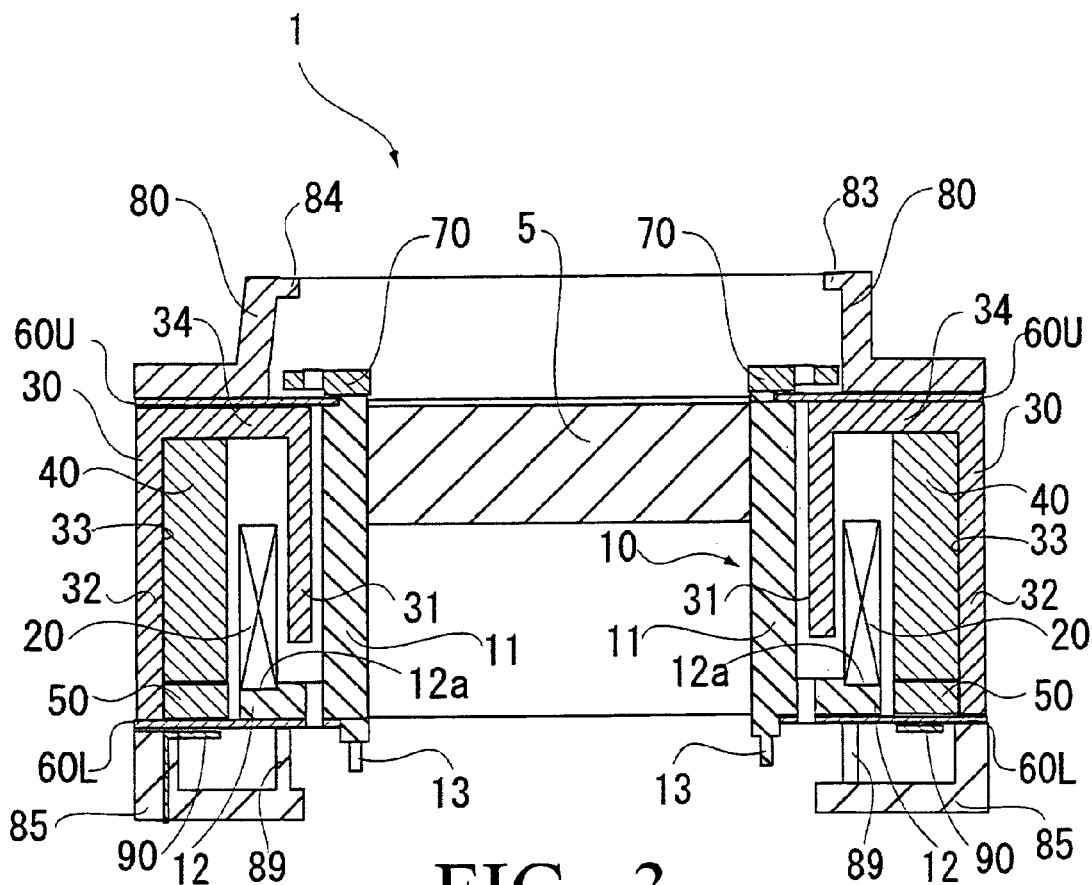
FIG. 3 is a schematic cross-sectional view of the autofocus actuator shown in FIG. 1.

FIG. 1 is a perspective view showing the external appearance of an autofocus actuator of a preferred embodiment according to the present invention, FIG. 2 is an exploded perspective view of the autofocus actuator shown in FIG. 1, and FIG. 3 is a schematic cross-sectional view of the autofocus actuator shown in FIG. 1.

As shown in FIGS. 1, 2 and 3, the autofocus actuator 1 is generally composed of: a holder 10 including a cylindrical portion 11 having one end to which a lens assembly 5 is attached, and a flange portion 12 provided along the perimeter of the other end of the cylindrical portion 11; a coil 20 fixedly secured to the holder 10 in a spaced-apart relationship with the outer periphery of the cylindrical portion 11; a cylindrical yoke 30 including an inner cylindrical portion 31 having an insertion bore 35 into which the cylindrical portion 11 of the holder 10 is inserted, an outer cylindrical portion 32 provided outside of the inner cylindrical portion 31 with a predetermined spacing left therebetween, and a connecting portion 34 for integrally interconnecting the ends of the inner cylindrical portion 31 and the outer cylindrical portion 32 at opposite side from the flange portion 12 of the holder 10, the yoke 30 adapted to accommodate the coil 20 within the space of a predetermined gap size between the inner cylindrical portion 31 and the outer cylindrical portion 32; a plurality of permanent magnets 40 disposed on the magnet mounting surface 33 of the inner periphery of the outer cylindrical portion 32 of the cylindrical yoke 30 in a spaced-apart confronting relationship with the coil 20; a magnetic member 50 disposed to interconnect the permanent magnets 40 in such a condition that the magnetic member 50 is kept in contact with the opposite surfaces of the permanent magnets 40 from the connecting portion 34 of the cylindrical yoke 30; a pair of leaf springs (gimbal springs) 60 including an upper leaf spring 60U and a lower leaf spring 60L provided on opposite end sides in an optical axis direction of the cylindrical portion 11 of the holder 10 for supporting the holder 10 displaceably in the optical axis direction with the holder being positioned in a radial direction thereof; a stopper 70 attached to the holder 10 for securing the upper leaf spring 60U between the holder 10 and the stopper 70 in a sandwich manner; a cover 80 and a base 85 which are used as a pair of support frames, respectively, and provided outside of the stopper 70 and the lower leaf springs 60L along the optical axis direction and adapted to secure the leaf springs 60 between the opposite end surfaces of the yoke 30 and the cover 80 and the base 85, respectively, in a sandwich manner, both of the cover 80 and the base 85 having opening portions 80a, 85a respectively formed at least on the parts that correspond to the lens assembly 5 attached to the holder 10; and a sheet-like electrode 90 provided between the lower leaf spring 60L and the base 85 for supplying electric power to the coil 20.

Hereinbelow, a description will be made with regard to the details of each of the components mentioned above. In this regard, it should be appreciated that the term "upper", "top" or its equivalent in the subject specification denotes the direction depicted by an arrow in FIG. 2, while the term "lower", "bottom" or its equivalent means the reverse direction.

The holder 10 is a molded component made of synthetic resin. The holder 10 has a cylindrical portion 11 of cylindrical configuration having one end (upper end) to which a lens assembly 5 is attached, and an annular flange portion 12 integrally formed along the perimeter of the other end (lower end) of the cylindrical portion 11. As illustrated in FIG. 3, the inside of the cylindrical portion 11 of the holder 10 is formed into a hollow space. Further, the inner periphery of the cylindrical portion 11 is formed with a female thread portion that can be threadedly engaged with a male thread portion provided on the outer periphery of the lens assembly 5. On the peripheral edge of the top surface of the flange portion 12 (the surface to the side of the cylindrical portion 11), there is provided a step portion 12a to which the coil 20 is bonded in positioning with the holder 10, as clearly shown in FIG. 3. Furthermore, on the bottom surface of the flange portion 12, a ring-shaped protrusion (step portion) 15 is concentrically formed, which is used for positioning the lower leaf spring 60L with respect to the holder 10. Three small bosses 13 are integrally formed with the protrusion 15 at an equal spacing in such a manner that they can extend in parallel with the optical axis.

As described above, the coil 20 is fixedly secured to the step portion 12a on the upper surface of the flange portion 12 of the holder 10 in a spaced-apart relationship with the outer periphery of the cylindrical portion 11 of the holder 10. A coated copper wire is used as the coil 20. This coil 20 is formed by the varying-number-of-winding method wherein a ten times winding layer and a nine times winding layer of the copper wire are alternately laminated one atop the other. The coil 20 is formed into an air core coil having the cross-section of annular shape. The coil 20 is wound in such a manner that the lead portions 21 on the terminal ends of the wound wire can be located to the side of the flange portion 12. Such an air core coil 20 is secured to the step portion 12a on the upper surface of the flange portion 12 of the holder 10 with an adhesive. In this regard, it should be noted that the coil 20 of the present invention is not limited to such a air core described above, and it may be contemplated, for example, to directly wind a coil around the cylindrical portion 11 of the holder 10.

Figure 4:
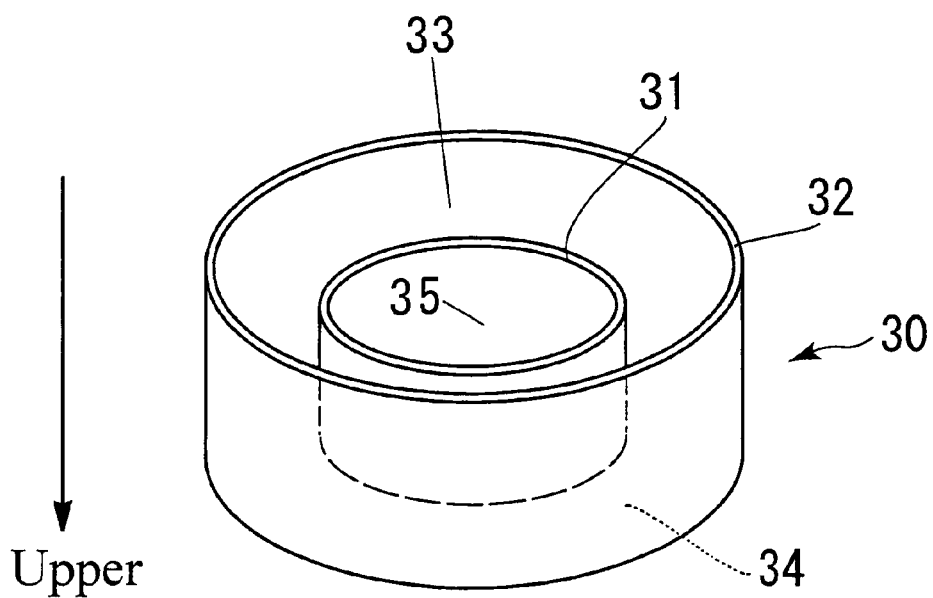
FIG. 4 is a perspective view illustrating a yoke of cylindrical configuration.

Referring to FIG. 4, the yoke 30 includes an inner cylindrical portion 31 of cylindrical shape having an insertion bore 35 into which the cylindrical portion 11 of the holder 10 is inserted, an outer cylindrical portion 32 of cylindrical shape provided outside of the inner cylindrical portion 31 with a predetermined spacing left therebetween, and a connecting portion 34 for integrally interconnecting the ends of the inner cylindrical portion 31 and the outer cylindrical portion 32 at opposite side from the flange portion 12 of the holder 10. The yoke 30 is adapted to accommodate the coil 20 within the space of predetermined gap size between the inner cylindrical portion 31 and the outer cylindrical portion 32 of the yoke 30.

The yoke 30 is made of a magnetic material, e.g., iron whose surface is plated with nickel. The cylindrical portion 11 of the holder 10 is inserted into the insertion bore 35 of the inner cylindrical portion 31 of the yoke 30 displaceably in the optical axis direction. For this purpose, the insertion bore 35 of the inner cylindrical portion 31 is formed such that it has a diameter greater than the diameter of the outer periphery of the cylindrical portion 11 of the holder 10 but smaller than the diameter of the peripheral edge of the flange portion 12 of the holder 10.

Moreover, as illustrated in FIGS. 2 through 4, the yoke 30 is formed so that the height in the optical axis direction of the inner cylindrical portion 31 as measured from the connecting portion 34 is smaller than the height in the optical axis direction of the outer cylindrical portion 32.

A plurality of, e.g., four, permanent magnets 40 are disposed on the magnet mounting surface 33 of the inner periphery of the outer cylindrical portion 32 of the yoke 30 in a spaced-apart confronting relationship with the coil 20. It should be noted that the magnet mounting surface 33 is not limited to the one provided, as described above, on the inner periphery of the outer cylindrical portion 32 of the yoke 30 but may be provided on the outer periphery of the inner cylindrical portion 31, if desired.

Each of the permanent magnets 40 consists of an arcuate permanent magnet extending over a sector of about 90 degrees along the contour of the circular magnet mounting surface 33. The permanent magnets 40 are made of neodymium. Each of permanent magnets 40 is magnetized such that, for example, the curved surface of the respective permanent magnet 40 kept in contact with the magnet mounting surface 33 is a south pole (S-pole) and the opposite curved surface is a north pole (N-pole). The outer periphery of the inner cylindrical portion 31 of the yoke 30 becomes an S-pole as these arcuate permanent magnets 40 are attached to the yoke 30 of cylindrical configuration. This creates a magnetic field that is directed from the arcuate permanent magnets 40 toward the inner cylindrical portion 31. In the event that the coil 20 is supplied with electric power, a force exerts on the coil 20 in the optical axis direction by the interaction between the magnetic field of the permanent magnets and the magnetic field generated by the electric current flowing through the coil 22. This makes it possible that the holder 10, that is, the lens assembly 5 is caused to displace in the optical axis direction. In this regard, it should be noted that the number of the permanent magnets is not particularly limited to four and may be changed to other plural numbers depending on the circumstances. Further, a single permanent magnet of, e.g., C-shape may be employed.

Figure 5:
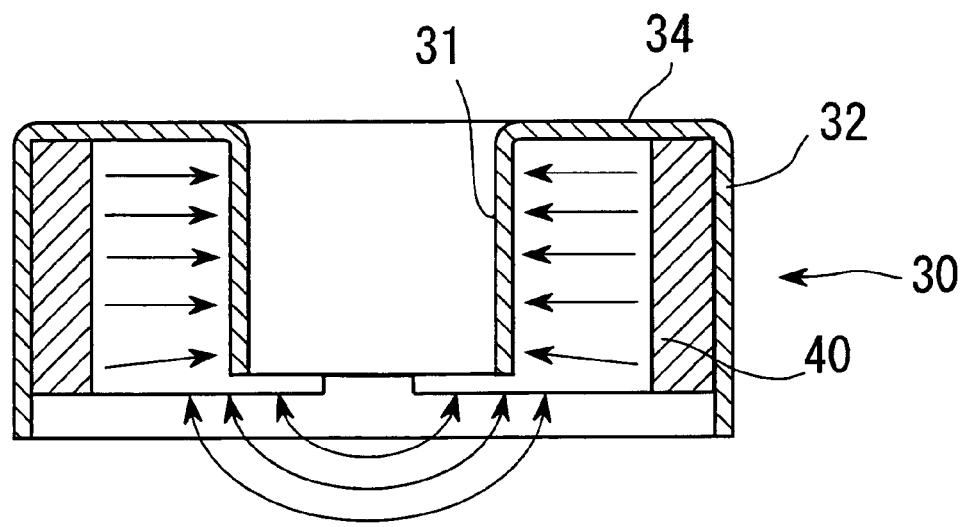
FIG. 5 is a cross-sectional view of the yoke illustrating the state of magnetic field in case that a permanent magnet alone is attached to the yoke.

In the meantime, with the yoke 30 set forth above, the magnetic flux is doomed to be leaked out downwards, as shown by arrows in FIG. 5, between the adjoining permanent magnets 40 at the open side of the cylindrical yoke 30 which is opposite to the connecting portion 34. In order to prevent such a leakage of the magnetic flux, the yoke 30 is provided with a leakage preventing means to enhance the driving force of the holder 10.

Figure 6:
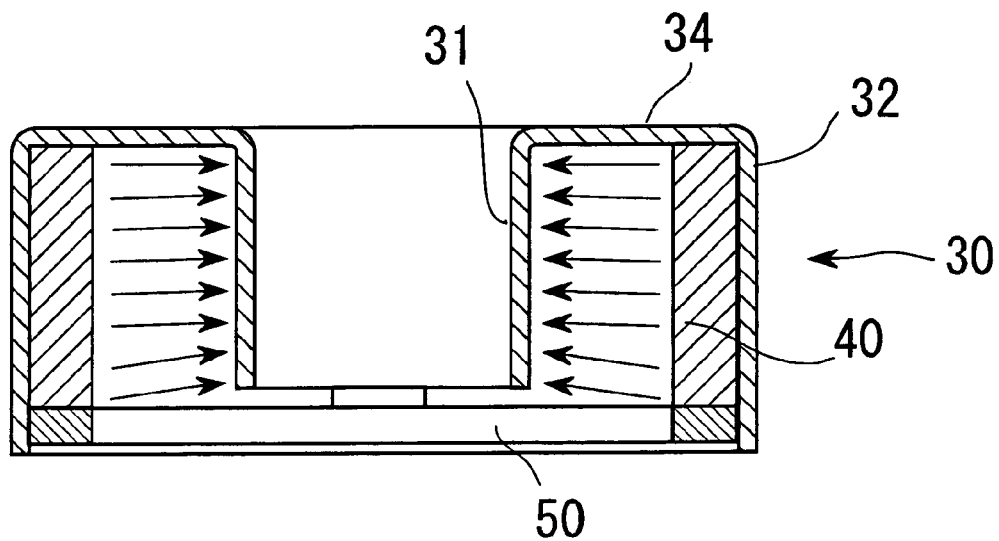
FIG. 6 is a cross-sectional view of the yoke illustrating the state of magnetic field in case that the permanent magnet is attached to the yoke in combination with a magnetic member.
Figure 7:
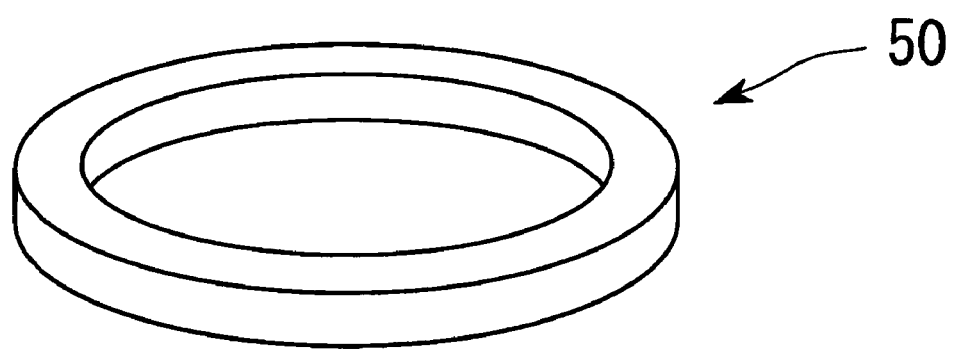
FIG. 7 is a perspective view illustrating the magnetic member of annular ring shape.

As the leakage inhibitor means, a magnetic member 50 is disposed to interconnect the permanent magnets 40 in such a condition that the magnetic member 50 is kept in contact with the lower end surfaces of the permanent magnets 40, that is, the surfaces of the permanent magnets 40 that are opposite to the surfaces thereof in contact with the connecting portion 34 of the cylindrical yoke 30. As shown in FIG. 6, the magnetic member 50 functions to reduce the amount of the magnetic flux which would otherwise be leaked out downwards. This will increase the magnetic flux that is directed from the permanent magnets 40 toward the inner cylindrical portion 31 of the cylindrical yoke 30. As depicted in to FIG. 7, according to the actuator 1 described above, the magnetic member 50 having an annular ring shape is attracted into contact with the permanent magnets 40 and then bonded to the permanent magnets 40 with an adhesive. Referring back to FIG. 6, the ring-shaped magnetic member 50 has the same width as the radial thickness of the arcuate permanent magnets 40. This allows the coil 20 to be disposed in the yoke 30 with no hindrance. Furthermore, under the state that the magnetic member 50 is attached to the permanent magnets 40, the lower surface of the ring-shaped magnetic member 50 is positioned at an upper elevation than the end surface of the outer cylindrical portion 32 of the yoke 30. This permits the lower leaf spring 60L to be attached to the end surface of the outer cylindrical portion 32 of the yoke 30 with no hindrance. Alternatively, the magnetic member 50 may be so sized that the bottom surface of the magnetic member 50 is flush with the end surface of the outer cylindrical portion 32 of the yoke 30 in the optical axis direction and such a magnetic member 50 is attached to the lower end surfaces of the permanent magnets 40, it becomes possible to utilize the bottom surface of the magnetic member 50 as an additional bonding surface with the lower leaf spring 60L.

In addition, there may a case that the corner portion defined by the magnet mounting surface 33 and the connecting portion 34 of the yoke 30 has a different contour than the corresponding corner portion of the permanent magnets 40. As a result, each of the permanent magnets 40 cannot make surface-to-surface contact with the magnet mounting surface 33 of the yoke 30, thereby reducing the magnetic efficiency. In such a case, another magnetic member 50 may be also inserted between the connecting portion 34 of the yoke 30 and the upper end surfaces of the permanent magnets 40 to thereby assure that the permanent magnets 40 can be brought into surface-to-surface contact with the magnet mounting surface 33 of the yoke 30 regardless of the contour of the corner portion of the yoke 30.

According to the actuator 1 described herein, the magnetic member 50 is made of a cold-rolled steel plate. However, the material for the magnetic member 50 is not particularly limited to steel but may include iron, nickel, cobalt and alloy of these metal elements.

Similarly, in the case of employing a single permanent magnet of, e.g., C-shape, the magnetic member 50 is disposed in contact with the lower end surfaces of the permanent magnets 40. This can suppress leakage of the magnetic flux which would otherwise be leaked out downwards between the opposite circumferential end surfaces of the C-shaped permanent magnet.

Figure 8:
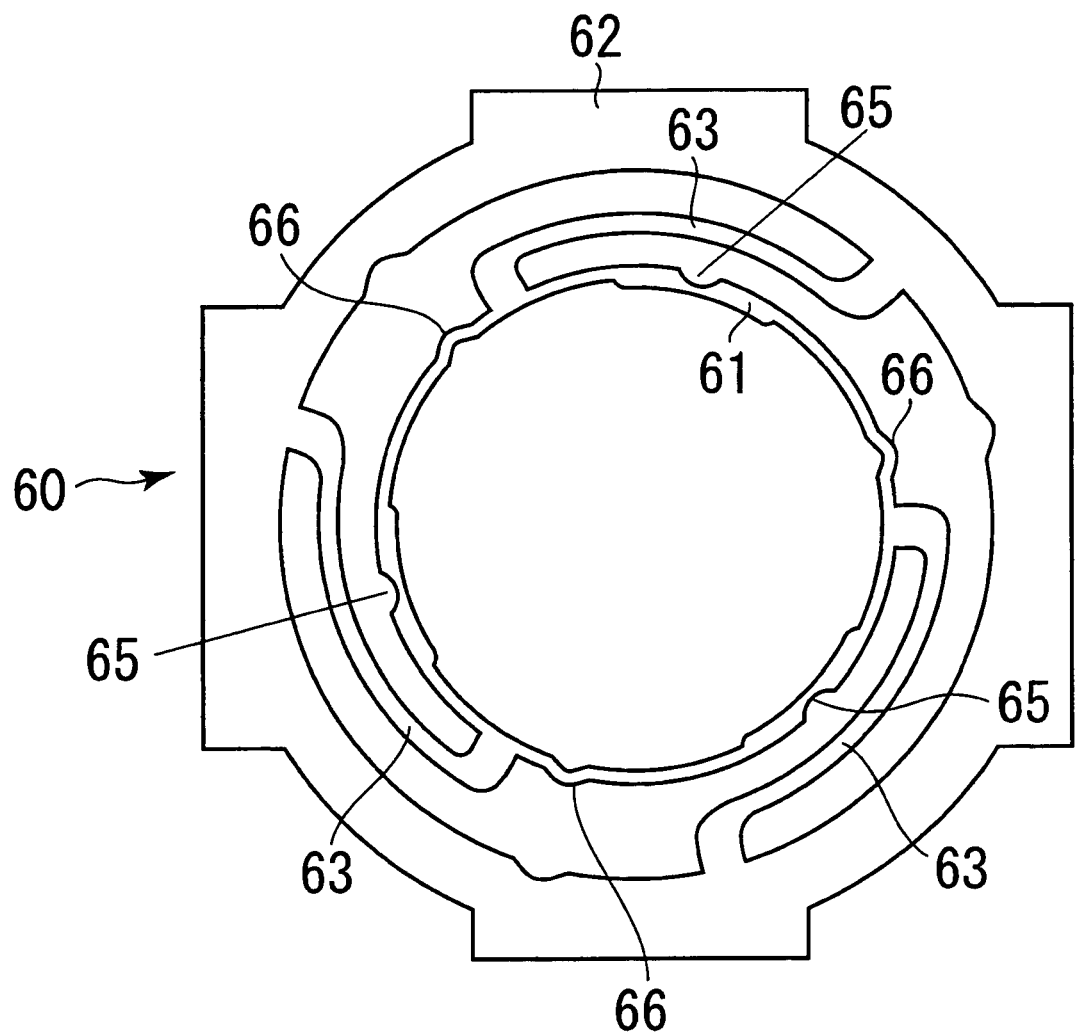
FIG. 8 is a top view illustrating a leaf spring.

Referring to FIG. 8, the leaf springs, namely, the upper leaf spring 60U and the lower leaf spring 60L, are made of a sheet-shaped metal material. Each of the upper leaf spring 60U and the lower leaf spring 60L is in the form of a gimbal spring that has an inner annulus 61, an outer annulus 62 provided in a spaced-apart relationship with the inner annulus 61, and a plurality of bridge portions 63 joining the inner annulus 61 and the outer annulus 62 together. The bridge portions 63 will be elastically deformed if a load is applied to the inner annulus 61 under the state that the outer annulus 62 remains fixedly secured. This means that the upper leaf spring 60U and the lower leaf spring 60L can support the holder 10, to which the inner annulus 61 is bonded, displaceably in the optical axis direction with the holder 10 being positioned in a radial direction thereof (that is, under the condition that radial displacement of the holder 10 is being restricted).

Formed on the top surface of the holder 10 is a step portion 16 that serves to align the upper leaf spring 60U with respect to the holder 10 in the process of assembly. This step portion 16 has a cross-sectional configuration that corresponds to the inner circumferential edge of the inner annulus 61. The upper leaf spring 60U is placed onto the top surface of the holder 10 with the inner annulus 61 thereof coupled to the step portion 16, and further a stopper 70 is attached onto the upper leaf spring 60U. The inner annulus 61 is bonded to the holder 10 under the state that it is sandwiched between the top surface of the holder 10 and the bottom surface of the stopper 70. Likewise, the outer annulus 62 is bonded to the cover 80 and the yoke 30 under the condition that it is sandwiched between the bottom surface of the cover 80 and the top surface of the connecting portion 34 of the yoke 30.

As described above, a step portion 15 for positionally aligning the lower leaf spring 60L in the process of assembly is formed on the bottom surface of the flange portion 12 of the holder 10. This step portion 15 has a cross-sectional configuration that corresponds to the inner circumferential edge of the inner annulus 61. Therefore, the inner annulus 61 is bonded to the holder 10 under the state that it is positionally aligned with respect to the holder 10. Likewise, the outer annulus 62 is bonded to the base 85 and the yoke 30 under the condition that it is sandwiched between the end surface of the outer cylindrical portion 32 of the yoke 30 and the top surface of the base 85.

Figure 9:
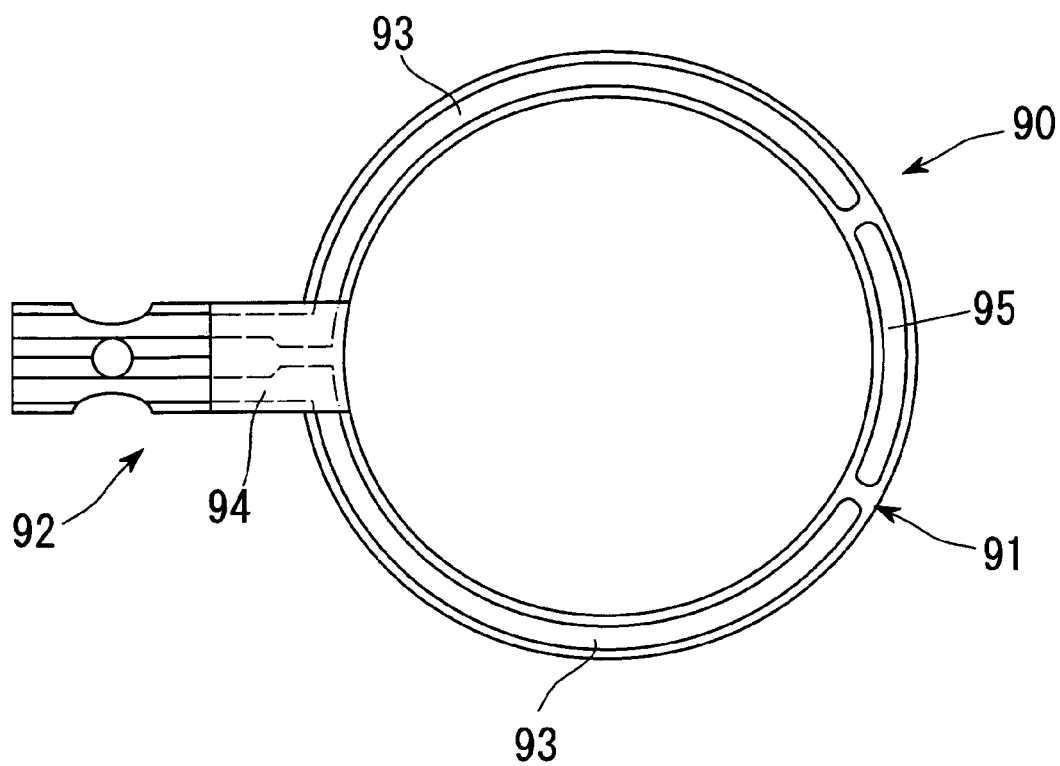
FIG. 9 is a top view illustrating a sheet-like electrode.

As illustrated in FIG. 3, a sheet-like electrode 90 is provided between the lower leaf spring 60L and the base 85 to supply electric power to the coil 20. Referring to FIG. 9, the sheet-like electrode 90 is made of a polyimide sheet, and has a generally circular ring-like portion 91 and an extension portion 92 extending radially outwardly from the ring-like portion 91.

A pair of copper-made terminal portions 93 are formed on one surface of the sheet-like electrode 90 in such a manner that it can extend from the extension portion 92 to the ring-like portion 91. Provided between the frontal ends of the two terminal portions 93 on the ring-like portion 91 is a dummy terminal portion 95 to which a dummy wire 23 described later is soldered.

Adhesive layers (not shown) that function to bond the sheet-like electrode 90 to the bottom surface of the outer annulus 62 of the lower leaf spring 60L are formed on the other surface of the sheet-like electrode 90 at the positions corresponding to the ring-like portion 91, the joining part of the extension portion 92 with the ring-like portion 91 and the frontal end part of the extension portion 92.

The extension portion 92 is adapted to extend to the outside of the support frame through an insert hole 88 of the base 85 described later and then can be connected to a sensor board not shown in the drawings. In order to have the extension portion 92 fitted through the insert hole 88, there is a need to bend the extension portion 92 substantially at a right angle with respect to the ring-like portion 91. A polyimide cover film 94 is provided over the terminal portions 93 for the sake of avoiding any damage of the terminal portions 93 which would otherwise occur during the bending process.

Figure 10:
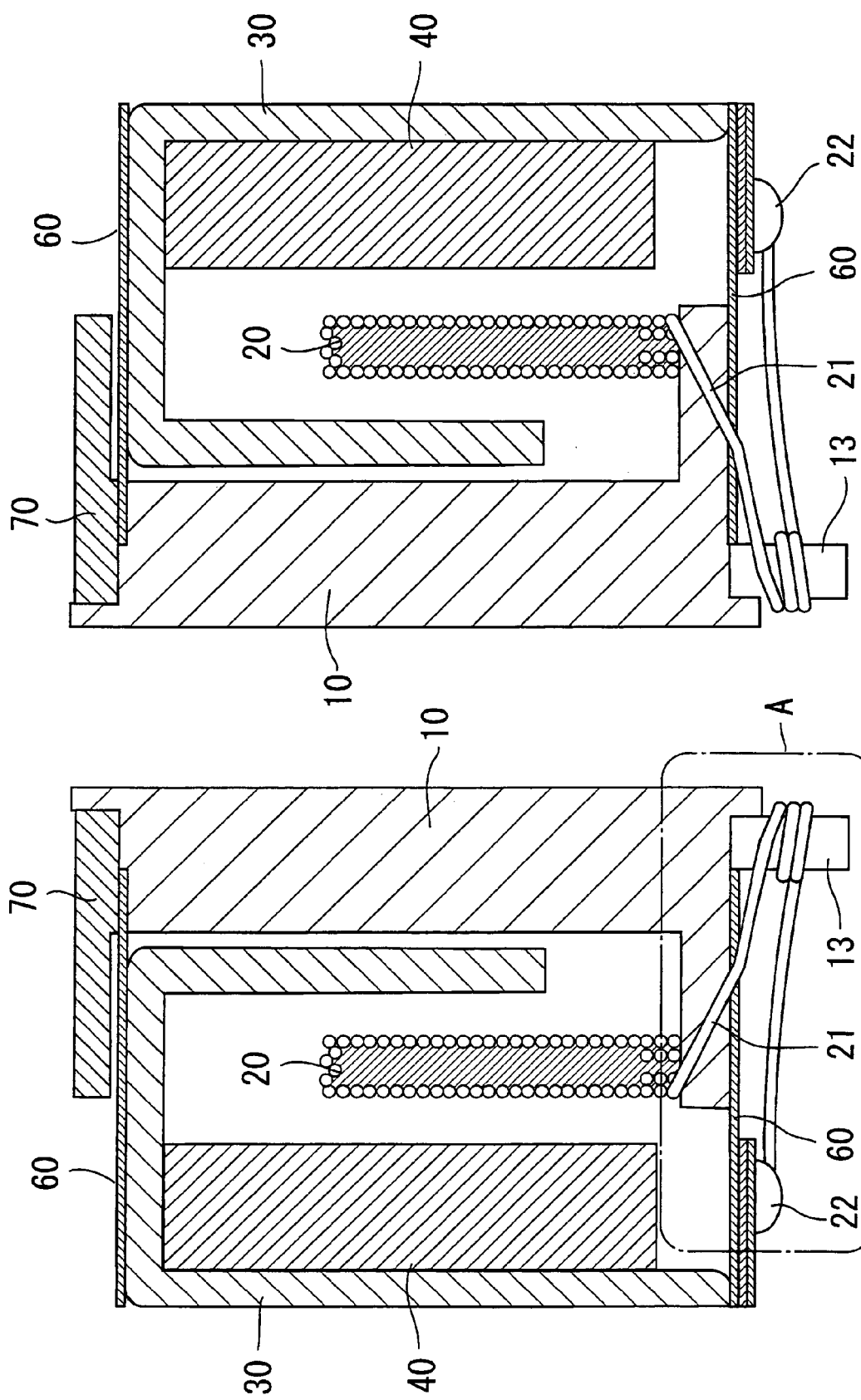
FIG. 10 is a partial schematic cross-sectional view of the autofocus actuator, illustrating the lead portion of a coil connected to the sheet-like electrode.

The two lead portions 21 of the coil 20 are soldered at their front ends to the two terminal portions 93 that are provided on the ring-like portion 91 of the sheet-like electrode 90, thus permitting the electric power to be supplied to the coil 20. In the meantime, the lead portions 21 may make an unwanted contact with other components as the holder 10 is caused to be displaced, and thereby a stress may be concentrated on the soldered front ends of the lead portions 21. In view of this, as illustrated in FIG. 10, base parts of the lead portions 21 of the wire of the coil 20 are respectively wound around two of the three small bosses 13 provided on the step portion 15 of the bottom surface of the flange portion 12 of the holder 10. Subsequently, the front ends of the lead portions 21 are soldered to the terminal portions 93 of the sheet-like electrode 90, respectively.

Each of the bosses 13 is of cylindrical shape and has a height small enough to avoid any contact, in an assembled condition, with the top surface of a bottom plate portion 86 of the base 85 described later.

Each of the lead portions 21 extends from the coil 20 into the bottom surface side of the flange portion 12 of the holder 10 through a recess 14 (see FIG. 12) formed on the peripheral edge of the flange portion 12. Then, the lead portions 21 are respectively wound around the corresponding bosses 13 located in the vicinity of the recess 14.

The lead portions 21 running between the bosses 13 and the soldering portions 22 are provided in a loosened condition to avoid any tensile stress which would otherwise be generated in the lead portions 21 as the holder 10 is caused to be displaced.

Figure 11:
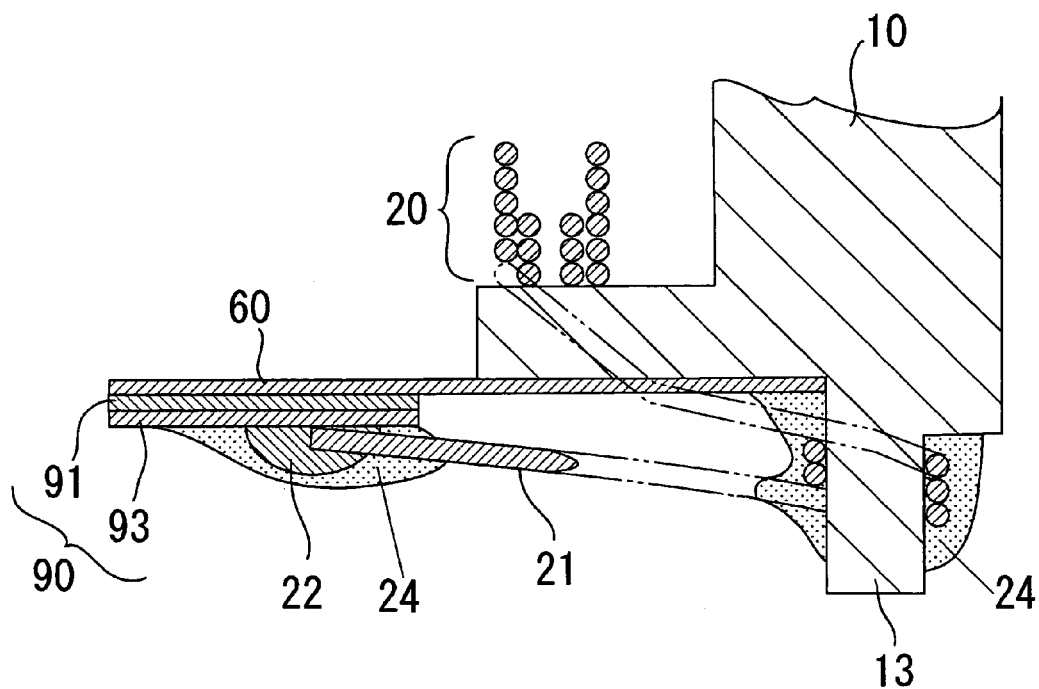
FIG. 11 is an enlarged view illustrating the part indicated by "A" in FIG. 10.

In the camera module 1 described above, as illustrated in FIG. 11, a stress relief agent 24 is applied to cover both the winding parts where the lead portions 21 are wound around the bosses 13 of the holder 10 and the soldering parts 22 where the front ends of the lead portions 21 are soldered to the terminal portions 93 of the sheet-like electrode 90. This helps prevent the stress from concentrating on a local part of each lead portion 21.

Figure 12:
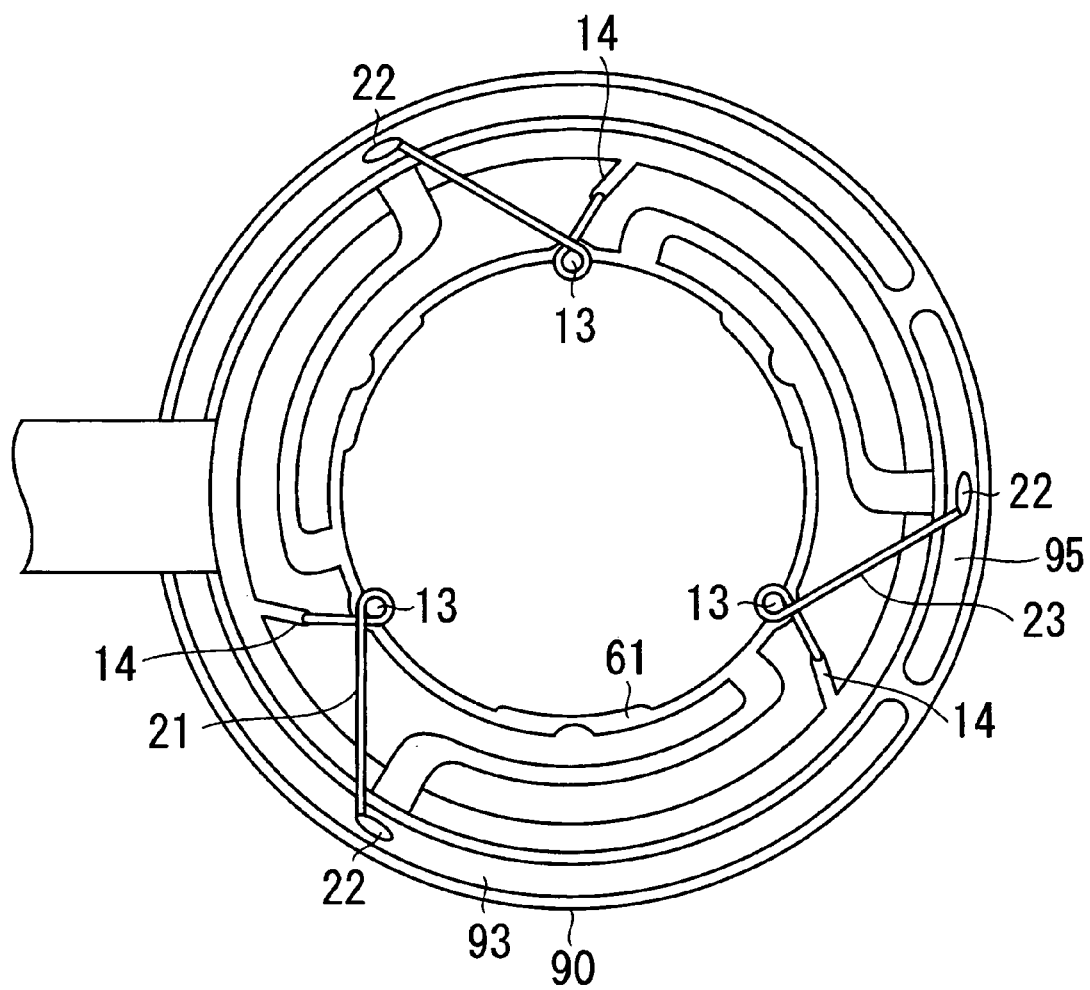
FIG. 12 is a top view showing the positional relationship between the flange portion of the holder, the lead portion of the coil and the sheet-like electrode.

Referring to FIG. 12, the bosses 13 are three in number and provided on the bottom surface of the flange portion 12 substantially at an equal spacing. Each of the three bosses 13 is inserted through a semicircular recess 66 (see FIG. 8) that lies on the inner edge of the inner annulus 61 of the lower leaf spring 60L bonded to the bottom surface of the flange portion 12.

As described above, the lead portions 21 of the coil 20 are wound around two of the three bosses 13. The remaining one boss 13 is used to support a balance keeping means.

The balance keeping means comprises a dummy wire 23 which is the same as that used in the coil 20. One end of the dummy wire 23 is wound on the corresponding boss 13, while the other end thereof is soldered to the dummy terminal portion 95 of the sheet-like electrode 90. This assures that the weight of the holder 10 is well balanced, thereby making it possible to displace the holder 10 in the optical axis direction with a stabilized posture.

A stress relief agent 24 is also applied to the dummy wire 23 so as to cover both the winding part wound on the boss 13 and the soldering part of the dummy wire 23. This helps prevent the stress from concentrating on a local part of the dummy wire 23 and assists in balancing the weight of the holder 10.

It should be noted that the actuator 1 is not particularly limited to the use of the above-mentioned sheet-like electrode 90. For example, if desired, a terminal portion for connection with the power source may be formed, by use of an insulating material, on a part of the bottom surface (the opposite surface from the holder 10) of the outer annulus 62 of the lower leaf spring 60L that is not displaced in accordance with the displacement of the holder 10, and then the front ends of the lead portions 21 of the coil 20 may be connected to the terminal portion so formed.

Figure 13:
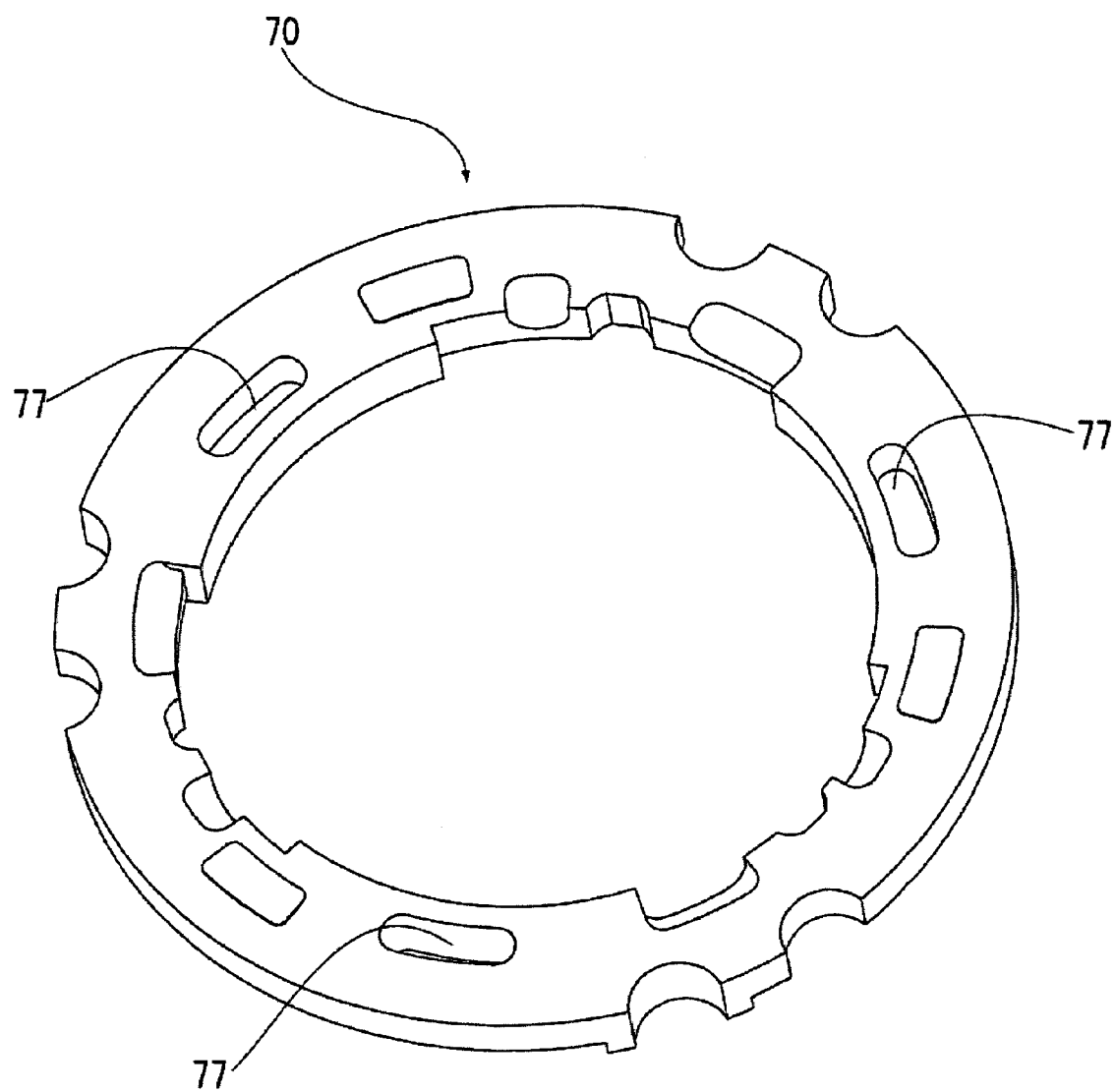
FIG. 13 is a perspective view of a stopper.

Referring to FIG. 13, the stopper 70 is made of synthetic resin in the form of a ring and will be subjected to bonding under the state that the inner annulus 61 of the upper leaf spring 60U is sandwiched between the holder 10 and the stopper 70.

The stopper 70 is assembled in such a manner that a part of the edge of each of three apertures 77 is in exact alignment with the contour of each of the semicircular recesses 65 (see FIG. 8) formed on the peripheral edge of the inner annulus 61 of the upper leaf spring 60U. This makes it possible to ascertain the clearance between the cylindrical portion 11 of the holder 10 and the inner cylindrical portion 31 of the yoke 30 by seeing through the apertures 77 and the semicircular recesses 65 from the top.

Referring back to FIG. 2, the upper leaf spring 60U is assembled such that a part of the outer annulus 62 of the upper leaf spring 60U can be sandwiched between the connecting portion 34 of the yoke 30 and the cover 80. The cover 80 is provided with a generally rectangular top plate portion 81 having an opening 80a and a plurality of post portions 82 respectively formed at the corners of the top plate portion 81 in such a manner that the post portions 82 extend vertically downwardly from the top plate portion 81.

The lower leaf spring 60L is assembled such that a part of the outer annulus 62 of the lower leaf spring 60L can be sandwiched between the end surface of the outer cylindrical portion 32 of the yoke 30 and the base 85. The base 85 is provided with a generally rectangular bottom plate portion 86 having an opening 85a and a plurality of post portions 87 respectively formed at the corners of the bottom plate portion 86 in such a manner that the post portions 87 extend vertically upwardly from the bottom plate portion 86.

The post portions 82 of the cover 80 and the post portions 87 of the base 85 correspond in their positions and are insertedly coupled with each other. This allows the cover 80 and the base 85 to be readily aligned in the process of assembly and then bonded together.

Figure 14:
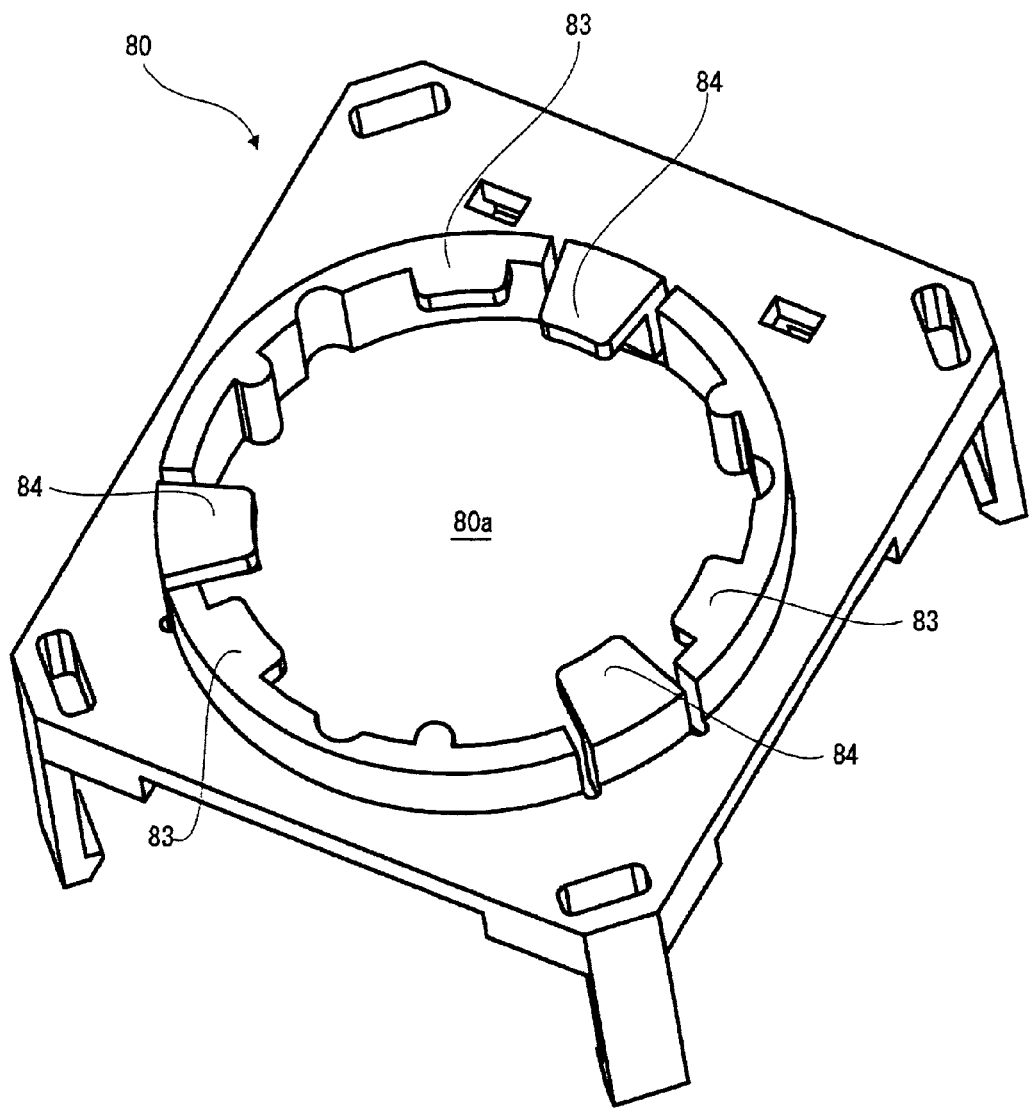
FIG. 14 is a perspective view of a cover of a preferred embodiment according to the present invention.
Figure 16:
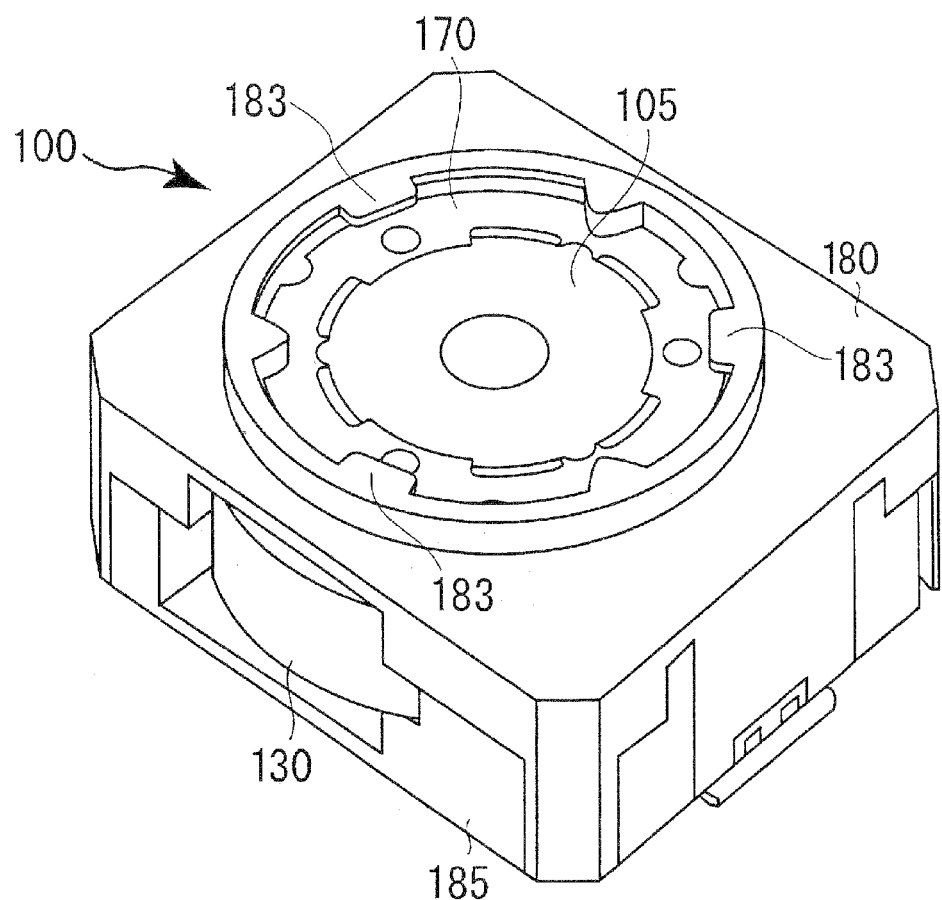
FIG. 16 is a perspective view of the prior art autofocus actuator.
Figure 17:
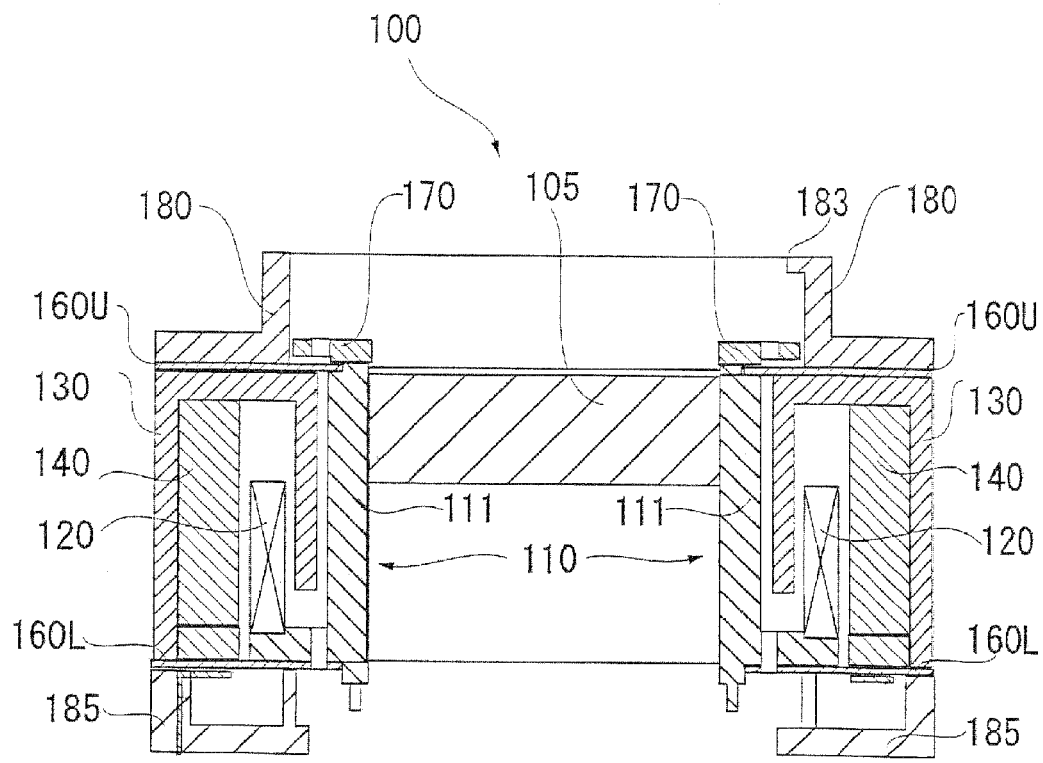
FIG. 17 is a cross-sectional view of the prior art autofocus actuator.

As shown in FIG. 1 and FIG. 14, the cover 80 is integrally formed with protruding portions 83 each protruding radially inwardly from the peripheral edge of the opening 80a so as to be located above the outer edge of the stopper 70. These protruding portions 83 are adapted to abut against the stopper 70 attached to the holder 10 to thereby suppress any unwanted displacement of the holder 10 in such an instance that a great magnitude of force exerts on the holder 10 by a falling shock, etc. However, only by the provision of such protruding portions 83, there is the same problem as that of the prior art described above with reference to FIGS. 16 and 17.

Therefore, in the present invention, the cover 80 is also equipped with shock absorbing means 84 (second displacement restriction means) in addition to the protruding portions (first displacement restricting means) 83 in order to improve shock resistance. The detailed structure of such a cover 80 will be described later with reference FIGS. 1, 14 and 15.

As shown in FIG. 2, the bottom plate portion 86 of the base 85 has an insert hole 88 through which the extension portion 92 of the sheet-like electrode 90 passes in the process of assembly.

Referring to FIG. 3, three projections 89 are integrally formed on the bottom plate portion 86 of the base 85 in the vicinity of the opening 85a and at a generally equal spacing in the circumferential direction. When assembled, the distal ends of the projections 89 remain in contact with the bottom surface of the flange portion 12 of the holder 10, for example. The height of each projection 89 is greater than the distance between the top surface of the bottom plate portion 86 of the base 85 and the lower leaf spring 60L. This means that the holder 10 is kept displaced in the upward direction. As a result, a resilient force is downwardly exerting on the respective leaf springs 60U and 60L that support the holder 10, thereby normally applying a back tension to the holder 10.

As illustrated in FIG. 2, three circular holes 86a are formed through the bottom plate portion 86 of the base 85 along the circumference of the opening 85a at a generally equal spacing. The condition of the soldering portion 22 on the sheet-like electrode 90 can be observed through the circular holes 86a from the outside of the base 85.

Hereinbelow, a description will be made with regard to the steps of assembling the autofocus actuator described above.

(1) The coil 20 is adhesively affixed to the step portion 12a on the top surface of the flange portion 12 of the holder 10.

(2) Next, four pieces of the permanent magnets 40 are arranged in predetermined positions and bonded to the magnet mounting surface 33 on the inner periphery of the outer cylindrical portion 32 of the yoke 30 with an adhesive. Under this state, the magnetic member 50 is attracted into contact with the bottom end surfaces of the permanent magnets 40 and then bonded thereto.

(3) Next, the holder 10 to which the coil 20 has been affixed assembled with the yoke 30 on which the magnetic member 50 has been mounted in the preceding step. At this time, the cylindrical portion 11 of the holder 10 is inserted into the insertion bore 35 of the inner cylindrical portion 31 of the yoke 30. The holder 10 and the yoke 30 are assembled such that the coil 20 can be accommodated within the space between the outer periphery of the inner cylindrical portion 31 of the yoke 30 and the permanent magnets 40.

(4) Next, under the state of step (3), the inner annuluses 61 of the respective leaf springs 60U and 60L are insertedly coupled with the top and bottom step portions 15, 16 of the holder 10, respectively, and then bonded thereto with an adhesive.

(5) Next, the stopper 70 is adhesively secured to the top surface of the upper leaf spring 60U already bonded at step (4) in a condition that the inner annulus 61 of the upper leaf spring 60U is sandwiched between the top surface of the cylindrical portion 11 of the holder 10 and the stopper 70.

(6) Next, the ring-like portion 91 of the sheet-like electrode 90 is bonded, by way of its adhesive layer, to the outer annulus 62 of the lower leaf spring 60L already bonded at step (4).

(7) Next, the lead portions 21 of the coil 20 and the dummy wire 23 are wound around the bosses 13 of the holder 10. Then, the front ends of the lead portion 21 and the dummy wire 23 are soldered to the terminal portions 93 of the sheet-like electrode 90 already bonded at step (6) and the dummy terminal portion 95, after which a stress relief agent 24 is applied to the winding parts of the bosses 13 and the soldering parts 22.

(8) Next, the cover 80 and the base 85 are attached to the assembly obtained at step (7) in such a manner that they can sandwich the outer annuluses 62 of the respective leaf springs 60U, 60L between the yoke 30 and themselves. The outer annulus 62 of the upper leaf spring 60U, which lies between the yoke 30 and the cover 80, is then bonded to the yoke 30 and the cover 80. Likewise, the outer annulus 62 of the lower leaf spring 60L, which lies between the bottom end surface of the outer cylindrical portion 32 of the yoke 30 and the base 85, is bonded to the bottom end surface of the outer cylindrical portion 32 of the yoke 30 and the base 85. At this moment, the extension portion 92 of the sheet-like electrode 90 is extended to the outside through the insert hole 88 of the base 85.

(9) Next, the lens assembly 5 is threadedly coupled with the thread portion of the holder 10 of the assembly assembled up to step (8).

Hereinbelow, an operation of the autofocus actuator 1 described above will now be described.

As viewed in FIG. 3, the magnetic field is caused to direct from the permanent magnets 40 to the inner cylindrical portion 31 of the yoke 30. If the holder 10 assumes its initial position and electric current flows in the counterclockwise direction as the coil 20 is viewed from the top, an upwardly exerting electromagnetic force is generated in the coil 20, i.e., the holder 10. This enables the holder 10 to be displaced until the electromagnetic force comes into balance with the resilient force of the leaf springs 60 that varies depending on the displacement of the holder 10. The electromagnetic force is controlled by the magnitude of the electric current flowing through the coil 20, meaning that the holder 10 and hence the lens assembly 5 can be displaced to a desired position by controlling the amount of the electric current. With the autofocus actuator 1, the information on the position of the lens assembly 5 can be obtained from the amount of the electric current flowing through the coil 20, while the information on the image can be detected by use of a detector element (not shown) located below the autofocus actuator 1. The autofocus position is specifically defined by way of speedily calculating the positional information and the image information in an operation part equipped with a predetermined autofocus algorithm. The autofocus actuator 1 can perform the autofocusing operation by controlling the electric current flowing through the coil 20 based on the result so calculated.

As described above, the feature of the present invention resides in the structure of the cover 80 of the autofocus actuator 1. Hereinbelow, the preferred embodiments of the cover 80 of the autofocus actuator 1 according to the present invention will be described in detail with reference to FIGS. 1, 14 and 15.

Figure 15:
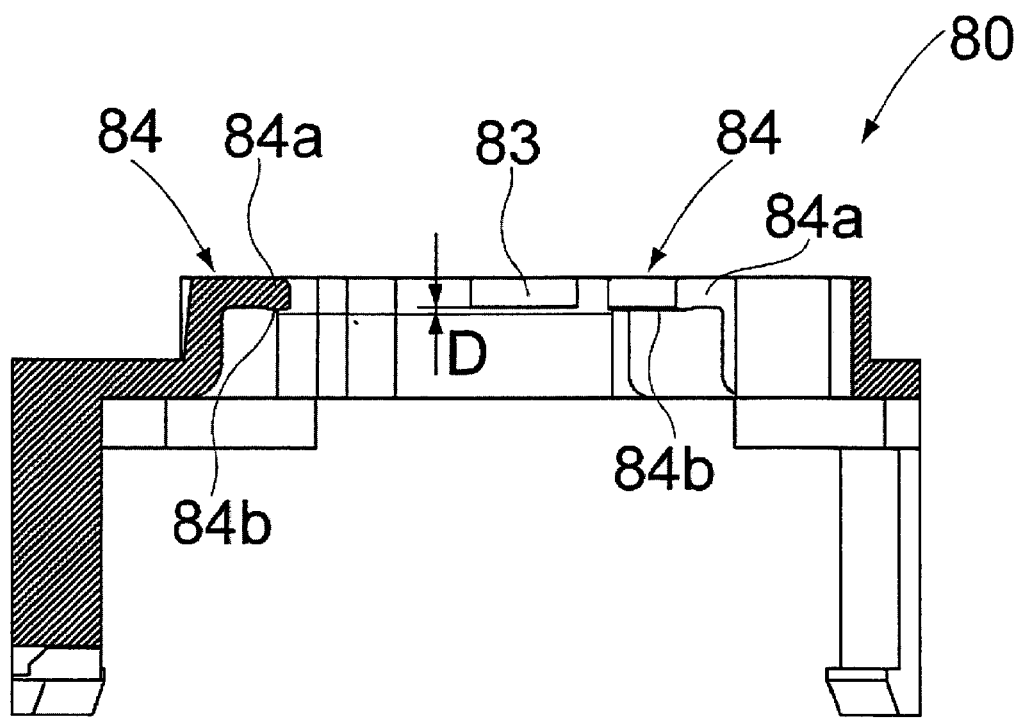
FIG. 15 is a cross-sectional view of the cover of the preferred embodiment according to the present invention.

In the present embodiment, the cover 80 which is one of the support frames is provided with shock absorbing means 84 which absorbs the shock applied to the holder 10 due to the stopper 70 which is attached (bonded) to the holder 10 making contact with the protruding portions 83. More specifically, as shown in FIGS. 1, 14 and 15, the shock absorbing means 84 is formed from three elastic tabs 84a. Each of the elastic tabs 84a is formed into a roughly L-shape having one end which is supported on the cover 80 and the other end 84b which protrudes inwardly from the peripheral edge of the opening 80a of the cover 80 in a cantilever manner so that the other end 84b makes abutment with the stopper 70 attached (bonded) to the holder 10 before the stopper 70 makes contact with the protruding portions 83.

Specifically, the lower surface of the other end 84b of each elastic tab 84a is formed to be closer to the holder 10 in the optical axis direction than the lower surface of each of the protruding portions 83. The difference in position (D in FIG. 16) of both surfaces in the optical axis direction is 0.05 mm. In other words, the lower surface of the other end 84b of each of the elastic tabs 84a makes contact with the stopper 70 which is attached (bonded) to the holder 10 before the stopper 70 makes contact with the protruding portions 83. Each elastic tab 84a has a roughly L-shape in which the cross-sectional area thereof gradually decreases from the one end thereof (that is, the portion supported on the cover 80) toward the other end 84b thereof, and this makes it possible to give good elasticity to each elastic tab 84a.

In this way, when the stopper 70 attached (bonded) to the holder 10 comes into abutment with the protruding portions 83, the elastic tabs 84a first abut against the stopper 70 attached (bonded) to the holder to absorb the kinetic energy of the holder 10, so that it is possible to absorb the shock applied to the holder 10.

Further, in the present embodiment, as shown in FIG. 15, the shock absorbing means 84 and the protruding portions 83 are formed in at least three locations at equal spacing in the circumferential direction of the opening 80a, and the shock absorbing means 84 and the protruding portions 83 are alternately arranged at adjoining positions, respectively.

Further, the elastic tab 84a is integrally formed with the cover 80 by injection molding. In this way, it is possible to form the shock absorbing means 84 on the cover 80 without increasing the process steps and the number of components.

Further, the cover 80 is formed from a liquid crystalline polymer. This means that the elastic tab 84a which is integrally formed with the cover 80 is also formed from a liquid crystal polymer, and this makes it possible to have sufficient toughness to absorb shocks.

Further, in a different embodiment of the shock absorbing means (second displacement restriction means), an elastic body is provided on the lower surface of at least one of the protruding portions 83 (not shown in the drawings). The elastic body may be formed from a silicon resin, a silicon rubber or the like so that the elastic body has a prescribed thickness in the optical axis direction. Accordingly, the surface of the elastic body provided on the at least one of the protruding portions 83 (the surface of the elastic body at the side of the holder 10) is positioned to be closer to the holder 10 (stopper 70) in the optical axis direction than the surface of the protruding portion 83 which is not provided with such an elastic body. In other words, the protruding portion 83 provided with the elastic body makes contact with the stopper 70 before the stopper 70 makes contact with the other protruding portions 83 which are not provided which such an elastic body.

In this way, when the stopper 70 attached (bonded) to the holder 10 comes into abutment with the protruding portions 83 which are not provided with such an elastic body (first displacement restriction means), the protruding portion 83 provided with the elastic body first abuts against the stopper 70 through the elastic body to absorb the kinetic energy of the holder 10 to which the stopper 70 is attached (bonded), so that it is possible to absorb the shock applied to the holder 10. Therefore, in this embodiment, the protruding portion 83 having such an elastic body (that is, the elastic body itself) functions as the shock absorbing means (second displacement restriction means) of the present invention.

In accordance with the autofocus actuator 1 according to the preferred embodiment of the present invention described above, when a compact electronic device equipped with the autofocus actuator 1 falls to the ground from a height where it was being used, the shock absorbing means 84 (that is, the elastic body) moderate the shock applied to the holder 10 due to the stopper 70 attached to the holder 10 making contact with the protruding portions 83. In this way, it is possible to improve the shock resistance of the autofocus actuator 1.

Further, in the embodiment, a description was given for the case in which the shock absorbing means 84 and the protruding portion 83 were formed in at least three locations at equal spacing in the circumferential direction of the opening 80a, but the present invention is not limited to this, and it is possible to form shock absorbing means and a protruding portion at four or more locations.

Further, in the embodiment, a description was given for the case in which the elastic tabs 84a were integrally formed with the cover 80, but the present invention is not limited to this. For example, elastic tabs may be formed from a metal plate which is a different material from that of the cover, and this plate may be mounted to the opening 80a of the cover 80.

Further, in the present embodiment, a description was given for the case in which the cover 80 was formed from a liquid crystal polymer, but the present invention is not limited to this, and it is possible to use other materials such as polycarbonate, polyethylene or the like, for example, in order to correspond with various shock forces.

Further, as another embodiment of the present invention, a description will be give for the case where the stopper 70 does not exist in the embodiments described above. In this case, an inner annular portion 61 of an upper leaf spring 60U is fixed by an adhesive to the top surface of the cylindrical portion 11. Further, the holder 10 may form an integral portion with the stopper 70. In the same way as in the embodiments described above, in order to restrict the displacement of the holder 10, protruding portions 83 which serve as first displacement restriction means protrude from the edge of the opening 80a of the cover 80. Further, in order to absorb the shock applied to the holder 10, shock absorbing means 84 which serve as second displacement restriction means are provided in the cover 80. The shock absorbing means 84 are formed from elastic tabs 84a provided integrally at the edge of the opening 80a of the cover 80 as described above. Further, alternatively, elastic bodies may be provided on the lower surface of the protruding portions 83.

In this embodiment, when a compact electronic device equipped with the autofocus actuator 1 falls to the ground from a height where it was being used, the shock absorbing means 84 absorb the shock applied to the holder 10 due to the holder 10 or the upper leaf spring 60U making contact with the protruding portions 83. In this way, it is possible to improve the shock resistance of the autofocus actuator 1.

Finally, it is also to be understood that the present disclosure relates to subject matter contained in Japanese Patent Application No. 2005-072022 (filed on Mar. 14, 2005) which is expressly incorporated herein by reference in its entirety.

Further, it should also be understood that the present invention is not limited to the preferred embodiments described hereinabove and, needless to say, a variety of modifications or variations may be made without departing from the scope of the invention defined in the following claims.

What is claimed is:

1. An autofocus actuator, comprising:
   a holder including a cylindrical portion having one end to which a lens unit is attached;
   a coil fixedly secured to the holder in such a manner as to surround the cylindrical portion of the holder;
   a yoke provided with permanent magnets in a spaced-apart confronting relationship with the coil;
   a pair of leaf springs for supporting the holder displaceably in an optical axis direction with the holder being positioned in a radial direction thereof;
   a stopper attached to the one end of the cylindrical portion of the holder for securing the upper leaf spring between the holder and the stopper in a sandwich manner; and
   a pair of support frames provided outside of the pair of leaf springs in the optical axis direction, respectively, and adapted to secure the leaf springs between the opposite end surfaces of the yoke and the support frames, respectively, in a sandwich manner, and these support frames having openings respectively formed at least on the parts thereof that correspond to the lens assembly attached to the holder; and
   a plurality of protrusions which protrude inwardly from the peripheral edge of the opening of one of the support frames positioned on the side of the one end of the holder for restricting displacement of the holder to which the stopper is attached together,
   wherein the holder to which the lens unit is attached being capable of adjusting its position in the optical axis direction by the interaction between the magnetic field of the permanent magnets and the magnetic field generated by electric current flowing through the coil when the electric current is supplied to the coil,
   wherein the autofocus actuator further comprises means provided in the one support frame for absorbing a shock applied to the holder caused by the abutment of the stopper attached to the holder against the protrusions due to excessive displacement of the holder, and the shock absorbing means being formed from at least one elastic tab having one end which is supported on the one support frame and the other end which protrudes inwardly from the peripheral edge of the opening of the support frame in a cantilever manner so that the other end makes abutment with the stopper attached to the holder before the stopper makes contact with the protrusions.

2. The autofocus actuator as claimed in claim 1, wherein the at least one elastic tab and the protrusions are respectively provided at three or more locations along the circumferential direction of the opening of the one support frame alternately with the same spacing therebetween.

3. The autofocus actuator as claimed in claim 1, wherein the elastic tab is integrally formed with the support frame.

4. The autofocus actuator as claimed in claim 1, wherein the one support frame is formed of a liquid crystalline polymer.

5. The autofocus actuator as claimed in claim 4, wherein at least one of the protrusions has a surface facing the holder, and the shock absorbing means includes an elastic body provided on the surface of the protrusion.

6. An autofocus actuator, comprising:
   a holder including a cylindrical portion having one end to which a lens unit is attached;
   a coil fixedly secured to the holder in such a manner as to surround the cylindrical portion of the holder;
   a yoke provided with permanent magnets in a spaced-apart confronting relationship with the coil;
   a pair of leaf springs for supporting the holder displaceably in an optical axis direction with the holder being positioned in a radial direction thereof;
   a stopper attached to the one end of the cylindrical portion of the holder for securing the upper leaf spring between the holder and the stopper in a sandwich manner; and
   a pair of support frames provided outside of the pair of leaf springs in the optical axis direction, respectively, and adapted to secure the leaf springs between the opposite end surfaces of the yoke and the support frames, respectively, in a sandwich manner, and these support frames having openings respectively formed at least on the parts thereof that correspond to the lens assembly attached to the holder; and
   a plurality of protrusions which protrude inwardly from the peripheral edge of the opening of one of the support frames positioned on the side of the one end of the holder for restricting displacement of the holder to which the stopper is attached together,
   wherein the holder to which the lens unit is attached being capable of adjusting its position in the optical axis direction by the interaction between the magnetic field of the permanent magnets and the magnetic field generated by electric current flowing through the coil when the electric current is supplied to the coil, and
   wherein the autofocus actuator further comprises means provided in the one support frame for absorbing a shock applied to the holder caused by the abutment of the stopper attached to the holder against the protrusions due to excessive displacement of the holder;
   wherein the one support frame is formed of a liquid crystalline polymer; and
   wherein at least one of the protrusions has a surface facing the holder, and the shock absorbing means includes an elastic body provided on the surface of the protrusion.

* * * * *